US 10,858,820 B2

(12) United States Patent
Navon

(10) Patent No.: US 10,858,820 B2
(45) Date of Patent: Dec. 8, 2020

(54) REINFORCED BEAM SYSTEM

(71) Applicant: Ram Navon, Nir-Akiva (IL)

(72) Inventor: Ram Navon, Nir-Akiva (IL)

(*) Notice: Subject to any disclaimer, the term of this patent is extended or adjusted under 35 U.S.C. 154(b) by 0 days.

(21) Appl. No.: 16/609,050

(22) PCT Filed: Apr. 18, 2018

(86) PCT No.: PCT/IL2018/050438
§ 371 (c)(1),
(2) Date: Oct. 28, 2019

(87) PCT Pub. No.: WO2018/203322
PCT Pub. Date: Nov. 8, 2018

(65) Prior Publication Data
US 2020/0056365 A1    Feb. 20, 2020

Related U.S. Application Data

(60) Provisional application No. 62/492,321, filed on May 1, 2017.

(51) Int. Cl.
*E04B 1/24* (2006.01)
*E04B 1/58* (2006.01)

(52) U.S. Cl.
CPC .............. *E04B 1/2403* (2013.01); *E04B 1/58* (2013.01); *E04B 2001/2418* (2013.01); *E04B 2001/2457* (2013.01); *E04B 2001/2463* (2013.01)

(58) Field of Classification Search
CPC .. E04B 1/2403; E04B 1/58; E04B 2001/2418; E04B 2001/2457;
(Continued)

(56) References Cited

U.S. PATENT DOCUMENTS

| 991,603 A | 5/1911 | Brooks |
| 1,970,965 A | 8/1934 | Leake |

(Continued)

OTHER PUBLICATIONS

International Search Report for PCT/II2018/050438, dated Jul. 25, 2018; 4 pages.
(Continued)

*Primary Examiner* — Rodney Mintz
(74) *Attorney, Agent, or Firm* — Roach, Brown, McCarthy & Gruber, P.C.; Kevin D. McCarthy

(57) ABSTRACT

A reinforced beam system comprises at least one pair of angularly spaced, corner-connected beams configured with two oppositely oriented triangular closed head portions, and a web interposed between head portions; a plurality of reinforcement elements forcibly contacting an interior wall of the corresponding head portion; and for each pair, at least one angled connector. A first leg of the angled connector abuts the flange of a second head portion of the first beam and is connected to a first reinforcement element inserted within the second head portion of the first beam, and a second leg of the angled connector abuts the flange of a first head portion of the second beam and is connected to a second reinforcement element inserted within both the first head portion of the second beam and a first head portion of the first beam. A beam system in one embodiment is devoid of reinforcement elements.

17 Claims, 14 Drawing Sheets

(58) Field of Classification Search
CPC ..... E04B 2001/2463; E04B 2001/2415; E04B 2001/2448; E04B 2001/2487; E04B 2001/249; E04B 7/045
See application file for complete search history.

(56) References Cited

U.S. PATENT DOCUMENTS

| | | | | |
|---|---|---|---|---|
| 3,221,467 | A * | 12/1965 | Henkels | E04C 3/09 52/690 |
| 3,566,561 | A * | 3/1971 | Tozer | A47B 96/1466 52/127.12 |
| 3,698,224 | A | 10/1972 | Saytes | |
| 3,786,612 | A | 1/1974 | Baker | |
| 5,464,302 | A * | 11/1995 | Menchetti | E04C 3/005 403/335 |
| 5,499,480 | A * | 3/1996 | Bass | E04C 3/07 52/653.1 |
| 5,553,437 | A | 9/1996 | Navon | |
| 5,664,388 | A * | 9/1997 | Chapman | E04C 3/065 52/262 |
| 5,692,353 | A * | 12/1997 | Bass | E04C 3/065 403/201 |
| 5,842,318 | A * | 12/1998 | Bass | E04C 3/065 52/653.1 |
| 5,901,523 | A * | 5/1999 | Tasi | A47B 57/54 248/223.41 |
| 5,904,025 | A * | 5/1999 | Bass | E04G 23/0218 52/167.3 |
| 6,073,410 | A * | 6/2000 | Schimpf | C04B 28/02 106/711 |
| 6,131,362 | A * | 10/2000 | Buecker | E04B 5/10 29/897.35 |
| 6,629,392 | B1 * | 10/2003 | Harrel | C04B 28/02 156/71 |
| 2003/0089069 | A1 * | 5/2003 | Babich | E04B 1/2403 52/693 |
| 2009/0007520 | A1 | 1/2009 | Navon | |
| 2009/0165419 | A1 | 7/2009 | Richard et al. | |
| 2016/0365033 | A1 | 12/2016 | Houghton et al. | |
| 2017/0218616 | A1 | 8/2017 | Richards | |

OTHER PUBLICATIONS

Written Opinion of the International Searching Authority for PCT/II2018/050438, dated Jul. 25, 2018; 5 pages.

* cited by examiner

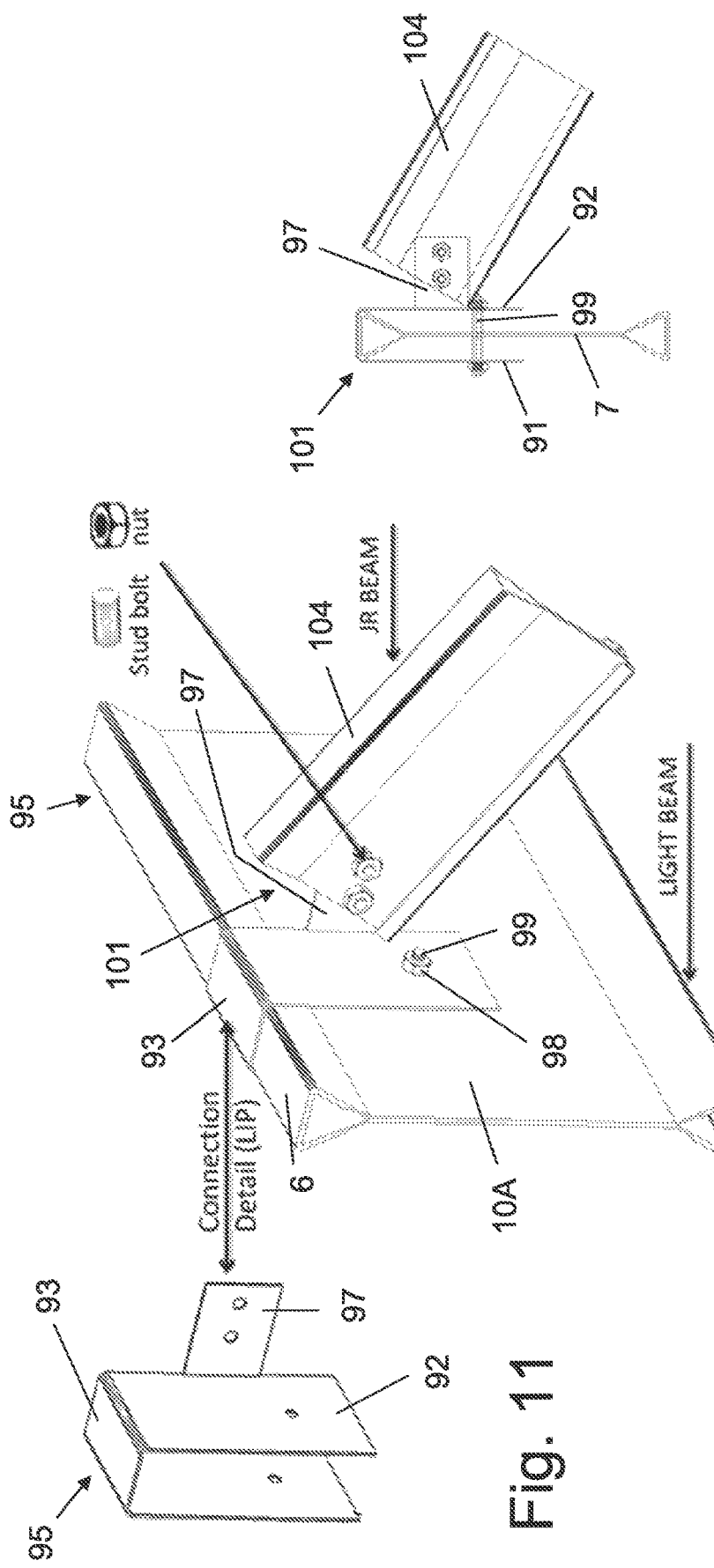

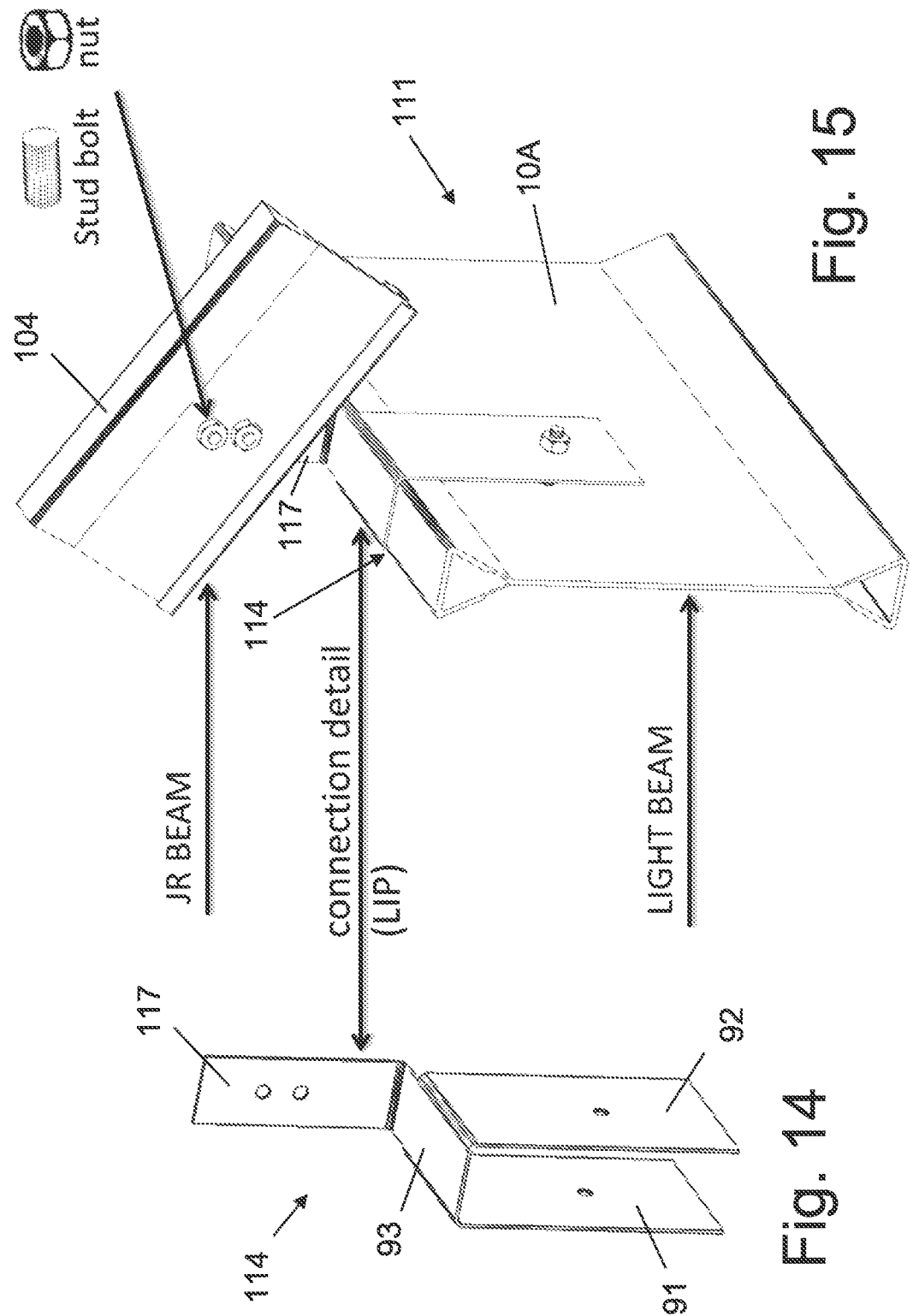

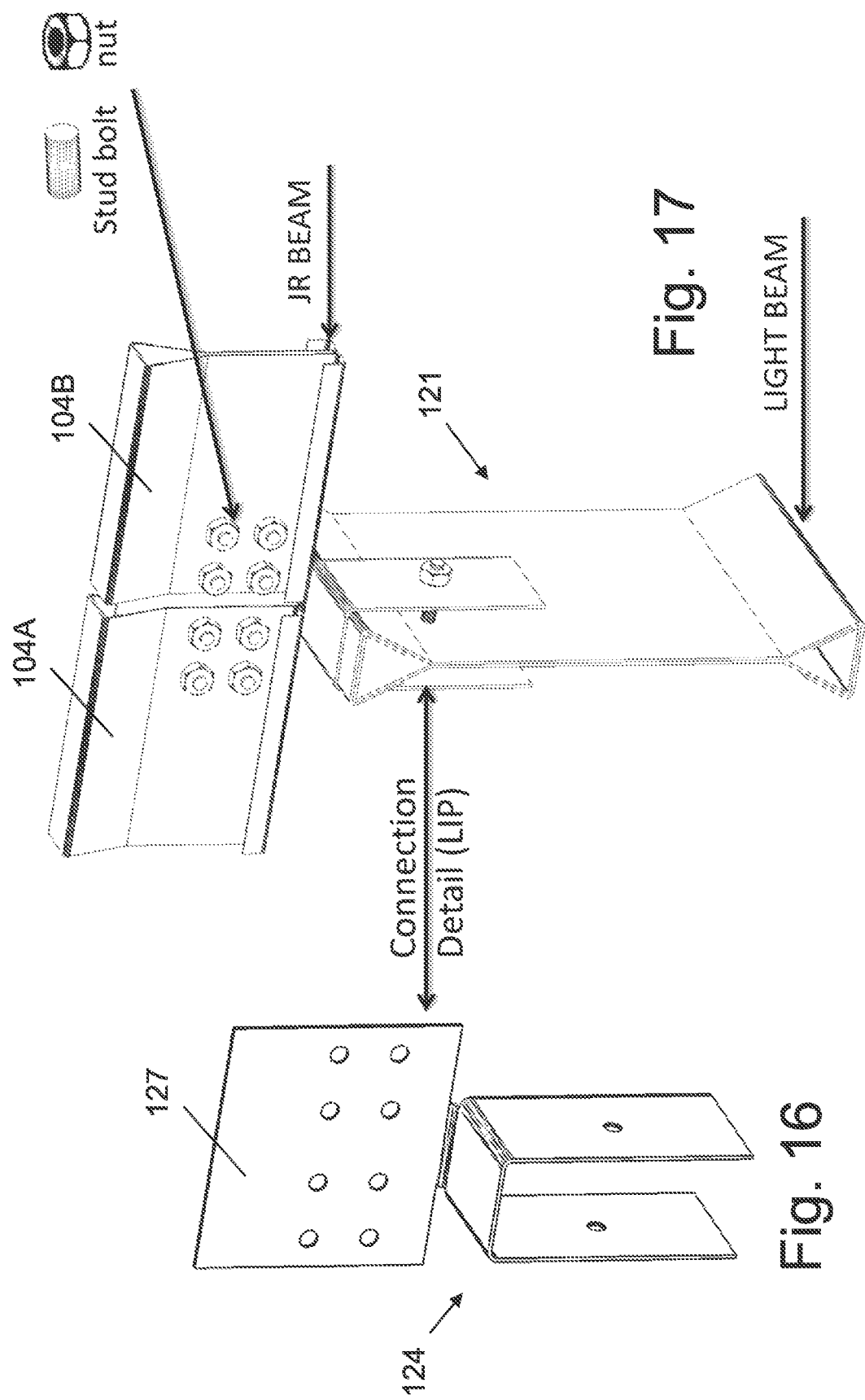

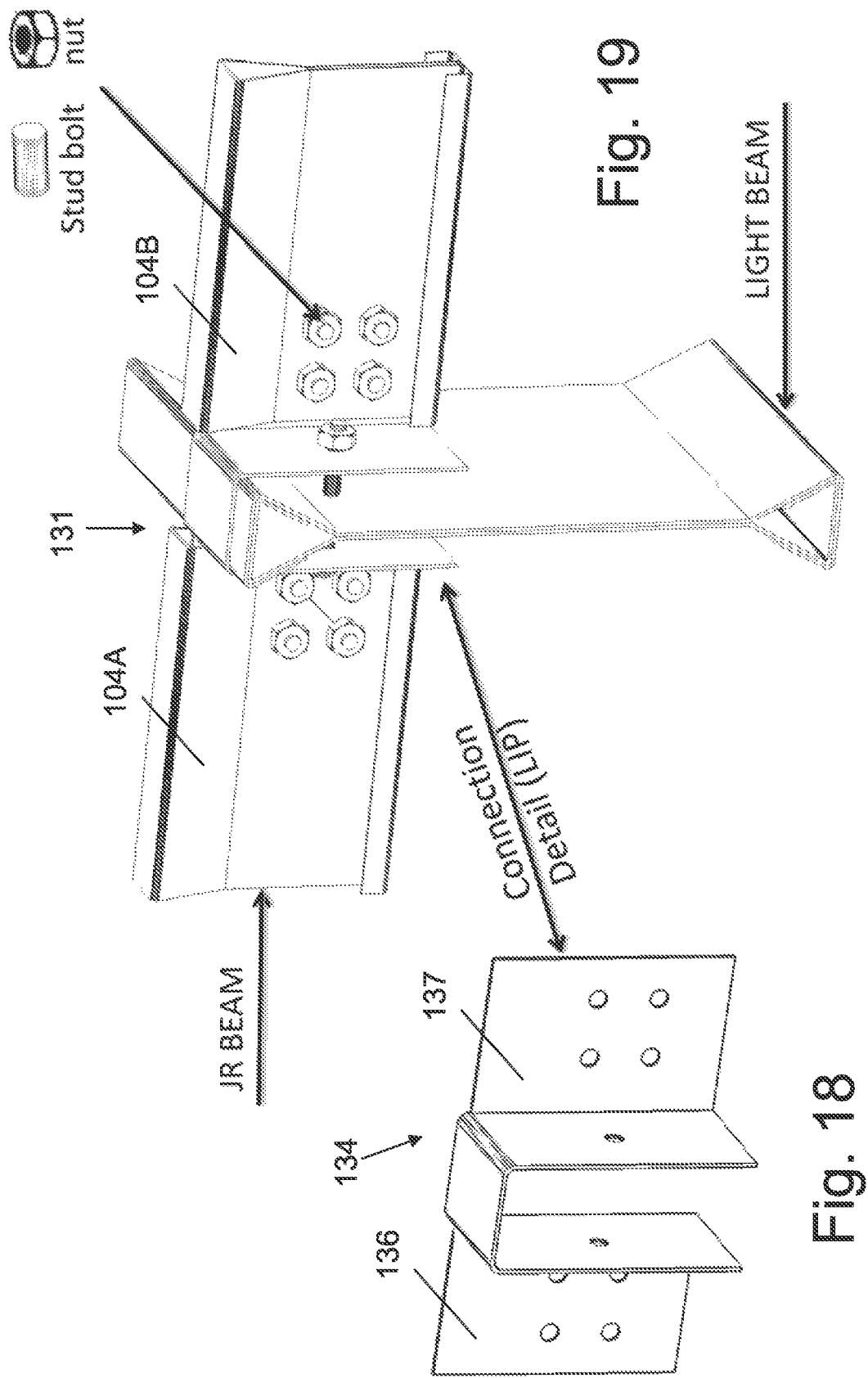

REINFORCED BEAM SYSTEM

FIELD OF THE INVENTION

The present invention relates to the field of structural beams. More particularly, the invention relates to a modular reinforced beam connector system, which is based on a lightweight beam having triangular head portions.

BACKGROUND OF THE INVENTION

Various types of structural beams are used in commercial and residential construction, including fabricated wooden girders, laminated wooden beams, reinforced concrete beams, and steel beams. Steel is the most commonly used material for beams, and such beams are configured by an I-section, H-section, C-section, Z-section and channel section. The various configurations of structural steel beams are most commonly manufactured by hot or cold rolling processes, and generally result in a relatively heavy beam for a given load bearing capacity.

I-beams are the most commonly used type of structural beam for constructing steel frames due to their relatively high load bearing capacity and moment of inertia. Such beams have a web and a pair of flanges perpendicular to, and in opposite edges of, the web such that the beams may be employed individually or in conjunction with a plurality of beams, and generally with a plurality of elements adapted to connect two or more beams, so as to safely support substantial static loads applied thereon. An assembly constructed from at least one beam or post, and generally from a plurality of beams or posts, and from one or more connecting elements will be referred herein as a "beam system".

I-beams are formed by a hot rolling process following the casting of molten iron in a billet. Most I-beams that are delivered to a construction site have standard dimensions, e.g. a length of 6 or 12 m, and undergo additional construction processes, so that they will be customized to the architectural and engineering specifications of the given construction project, including cutting and welding one or more webs or one or more flanges to achieve a beam of desired dimensions, welding a connecting element to the beam, smoothing welded junction points, painting and galvanizing the beam or beam system, and assembling the beam or beam system in the frame structure. These additional construction processes are time consuming and costly.

It would be desirable, and that is the intent of this invention, to reduce the production and assembly costs of a beam system without compromising its structural properties.

Numerous structural beams fabricated from sheet steel, which require less steel than I-beams while providing the same load bearing capacity, are known in the prior art. For example, U.S. Pat. No. 991,603 issued to Brooks and U.S. Pat. No. 3,698,224 issued to Dunn et al disclose a metallic pseudo-I beam formed of a single piece of material which is bent to form hollow flanges at the top and bottom. U.S. Pat. No. 5,553,437 issued to the same inventor of the present invention discloses a pseudo-I beam made of two opposite oriented and interleaved members having a triangular head portion, a web portion, a web flange, and tail flange. The triangular shape of the head flange provides improved lateral stability with respect to conventional I-beams due to its biaxial symmetry.

Such prior art lightweight structural beams with triangular head portions are not readily formable by an automatic process. Firstly, the beams are produced by a cold rolling process during which sheet metal is passed through a plurality of pairs of rollers below its recrystallization temperature, annealed and bent to the desired shape. After two apices of the triangular are shaped, the fed metal sheet cannot be suitably supported to form the third apex due to the inaccessibility thereof. Also, the desired length of a structural beam is often 15 m, and the required thickness of the sheet metal needed for the fabrication of a structurally strong beam with triangular head portions is on the order of 8 mm, a thickness much greater than that which most commercial cold rollers can handle.

Butler Manufacturing Company, USA manufactures modular beam systems, as described in http://www.butler-mfg.com/building_systems/structural.asp. These beam systems employ various components such as solid-web primary I-beam frames without triangular head portions, prepunched open-web truss purlins, which are secondary structural members, and rod bracing. In these systems, the beam system components are galvanized after the components are fabricated, and are welded together. Consequently the cost of manufacturing and assembly are relatively high. Furthermore, connecting elements are welded to the flange and not to the web portion. Stress is therefore concentrated on the flange, causing the components to be even more massive and costly.

It is an object of the present invention to provide a beam system based on a beam having a triangular head portion.

It is an additional object of the present invention to provide a beam system by which the beams are reinforced but with minimized stress concentration.

It is an additional object of the present invention to provide a beam system that facilitates simple fabrication and assembly operations.

It is an additional object of the present invention to provide a modular beam system configured such that all of its components are assembled without need of welding.

Other objects and advantages of the invention will become apparent as the description proceeds.

SUMMARY OF THE INVENTION

A reinforced beam system comprises one or more pairs of angularly spaced, corner-connected beams, first and second beams of at least one of said pairs configured with two oppositely oriented triangular closed head portions, a base of which defining a flange, and a web interposed between said two closed head portions; a plurality of reinforcement elements, each of which inserted within an interior of a corresponding one of said head portions and forcibly contacting an interior wall of said corresponding head portion; and for each of said pairs of corner-connected beams, at least one angled connector, wherein a first leg of one of said angled connectors is in abutment with the flange of a second head portion of said first beam and is connected to a first of the reinforcement elements which is inserted within said second head portion of said first beam, and a second leg of said one angled connector is in abutment with the flange of a first head portion of said second beam and is connected to a second of the reinforcement elements which is inserted within both said first head portion of said second beam and a first head portion of said first beam.

Each of the reinforcement elements, by being inserted within an interior of the corresponding head portions and forcibly contacting an interior wall of the corresponding head portion, provides the beam reinforced thereby with the same load bearing capacity and moment of inertia as a prior art beam with the same dimensions, but with a 10-15% reduction in weight since thinner sheet metal from which the beam is formed may be employed.

An angled connector serves to transmit shear forces between the web of the first beam to a web of a second beam, or between the flange of the first beam to the flange of a second beam, even when the beam is galvanized or painted, resulting in reduced-magnitude moments at a moment connection.

The material from which the beam, reinforcement element and angled connector is made may be steel, aluminum or other structurally strong material.

As referred to herein, a "beam" or a "composite beam", the latter comprising two members nested one within the other, is a rigid elongated structural member with two oppositely oriented head portions and a web interposed between said two head portions, wherein at least one of said head portions is triangular and closed, and the flange of its triangular head portion which is generally perpendicular to the web is disposed at any convenient orientation, including a horizontal orientation, a vertical orientation when serving as a post, and an oblique orientation, for example when serving as a ridge beam. A "transversal" direction means along the length of the beam. A "longitudinal" direction means the direction between the two triangular head portions of a beam. A "lateral" direction means the direction between the two web portions of a composite beam. The "orientation" of the beam refers to the orientation of the flange.

In one aspect, the second reinforcement element is a second angled connector which is arranged such that a first leg of said second angled connector is inserted within an interior of the first head portion of the first beam and a second leg of said second angled connector is inserted within an interior of the first head portion of the second beam.

In one aspect, the beam system further comprises a third angled connector for the at least one pair of corner-connected beams, wherein a first leg of said third angled connector is in abutment with the flange of the first head portion of the first beam and is connected to the first leg of the second angled connector, and a second leg of said third angled connector is in abutment with the flange of a second head portion of the second beam and is connected to a third reinforcement element which is inserted within said second head portion of the second beam.

In one aspect, the first beam is a vertically oriented beam and the second beam is a horizontally oriented beam, and the first and second legs of the one angled connector are angularly spaced by an angle of approximately 90 degrees.

In one aspect, one or more of the reinforcement elements forcibly and unconnectedly contacts an interior wall of the corresponding head portion.

In one aspect, one or more of the reinforcement elements is connected to the interior wall of the corresponding head portion.

In one aspect, one or more of the reinforcement elements is connected by one or more cold fasteners to the interior wall of the corresponding head portion.

In one aspect, one or more of the reinforcement elements is welded to the interior wall of the corresponding head portion.

In one aspect, one or more of the reinforcement elements is configured as an inverted U-shaped bar having a base in forcible contact with the flange of the corresponding head portion and two legs in forcible contact with two oblique elements, respectively, of the corresponding head portion and directed towards a junction between the corresponding head portion and the web.

In one aspect, one or more of the reinforcement elements has a uniform longitudinal dimension and is in forcible contact with the flange of the corresponding head portion.

In one aspect, each of the first and second beams is a composite beam consisting of two separate members arranged such that corresponding head portions of said two members are nested one within the other and adjacent elements of said two members are in mutual stabilizing contact. Each member of the composite beam comprises a first head portion, a second head portion, and a longitudinally disposed web portion interposed between said first head portion and second head portion, said first and second head portions being configured with a corresponding essentially laterally disposed flange, an oblique element extending from a first lateral end of said flange to said web portion, and an oblique lip extending from a first lateral end of said flange and having a length considerably shorter than that of said oblique element.

The following are some advantages of the beam:
1. Lateral Stability—The triangular configuration of a head portion increases stability, particularly beneficial when the flange is in compression.
2. Biaxial Symmetry—Eccentricity of loading is minimized, assisting in reducing the problem of lateral instability to minimize the requirement for bracing and/or bridging.
3. Strength Optimization—The flange and web thickness can each be adjusted, to optimize the flexural and shear strength and to allow for beam weight efficiency.
4. Reduction of Web Ratio—The mutual stabilizing contact of adjacent elements of the two members of a composite beam helps to reduce the length of the unstiffened portion of the web and to improve the buckling resistance of the web.
5. Roll Formed—the entire triangular head portion of the load bearing beam is accessible to rollers, to facilitate a speedy, automatic and economical forming operation.
6. Unwelded Connector Compatibility—The beam is configured with apertures facilitating cold fastening to a connector adapted to transmit moments and shear forces while complying with engineering standards.
7. Earthquake Resistance without Welding Additional fabrication techniques for the beam may be implemented together with the roll forming procedure, including stamping, rib forming, clinching and riveting.

In one aspect, longitudinally separated first and second head portion junctions of the composite beam at a junction between nested head portions and mutual stabilizingly contacting web portions are coplanar on a plane perpendicular to the corresponding flange.

In one aspect, a corrugated metal sheet is connected to two or more laterally spaced beams and to the reinforcement element inserted therewithin.

In one aspect, the vertically oriented beam is embedded in a foundation. An additional vertically oriented beam may be nested within, and connected to, the embedded beam.

In one aspect, the beam system further comprises two or more foundation-embedded beams and a horizontally oriented beam connected to each two adjacent foundation-embedded beams by the first and second angled connectors.

In one aspect, the beam system further comprises a C-shaped hanger for connecting two or more of the hangers to each other.

In one aspect, the beam system is used as a truss connection.

A beam system with a reinforced moment connection comprises one or more pairs of angularly spaced, corner-connected beams, first and second beams of at least one of said pairs configured with two oppositely oriented triangular closed head portions, a base of which defining a flange, and a web interposed between said two closed head portions; and for each of said pairs of corner-connected beams, two or more angled connectors, wherein a first leg of a first of said angled connectors is connected to the flange of a second head portion of said first beam, and a second leg of said first angled connector is connected to the flange of a first head portion of said second beam, and wherein a first leg of a second of said angled connectors is connected to the flange of a first head portion of said first beam, and a second leg of said second angled connector is connected to the flange of a second head portion of said second beam.

In one aspect, the beam system further comprises a flanged end plate connecting each lateral face of the web of the first beam and the second leg of the first angled connector.

In one aspect, the beam system further comprises a plurality of reinforcement elements, each of which inserted within an interior of a corresponding one of the head portions and forcibly contacting an interior wall of said corresponding head portion.

BRIEF DESCRIPTION OF THE DRAWINGS

In the drawings:

FIG. 11 is a perspective view from the top of an embodiment of a beam-connecting hanger;

FIG. 12 is a perspective view from the top of a beam system comprising the hanger of FIG. 11;

FIG. 13 is a side view of the beam system of FIG. 12;

FIG. 14 is a perspective view from the top of an embodiment of a beam-connecting hanger;

FIG. 15 is a perspective view from the top of a beam system comprising the hanger of FIG. 14;

FIG. 16 is a perspective view from the top of an embodiment of a beam-connecting hanger;

FIG. 17 is a perspective view from the top of a beam system comprising the hanger of FIG. 16;

FIG. 18 is a perspective view from the top of an embodiment of a beam-connecting hanger;

FIG. 19 is a perspective view from the top of a beam system comprising the hanger of FIG. 18.

DETAILED DESCRIPTION OF THE INVENTION

The present invention is a novel reinforced beam system comprising one or more lightweight structural beam having two triangularly shaped head portions which provide an increased lateral stability and strength to weight ratio with respect to conventional I-beams, and at least one reinforcing element inserted within the interior of, and connected to, a head portion of the beam.

While some prior art beams have been configured with triangularly shaped head portions produced by a cold rolling process, these head portions are closed triangles and the third side thereof cannot be quickly and automatically shaped due to its inaccessibility and the inability of rollers to support the fed sheet metal as it is bent to form a closed triangle. In contrast, the beam of the present invention is a composite beam made of two separate and oppositely oriented members arranged such that corresponding head portions of the two members are nested one within the other. Each head portion is an incomplete triangle, so that the lip, i.e. an extremity, of a member is sufficiently accessible to rollers to allow the desired configuration of the member to be shaped. When a head portion of one member is nested within the corresponding head portion of the other member, a closed triangle having two-layered and therefore stiffened apices is produced. No welding is needed, and therefore the production of such a beam and the assembly of a beam system employing one or more of the beams are quicker and more economical than, and have substantially the same load bearing capacity than, that of the prior art.

Figure 1:
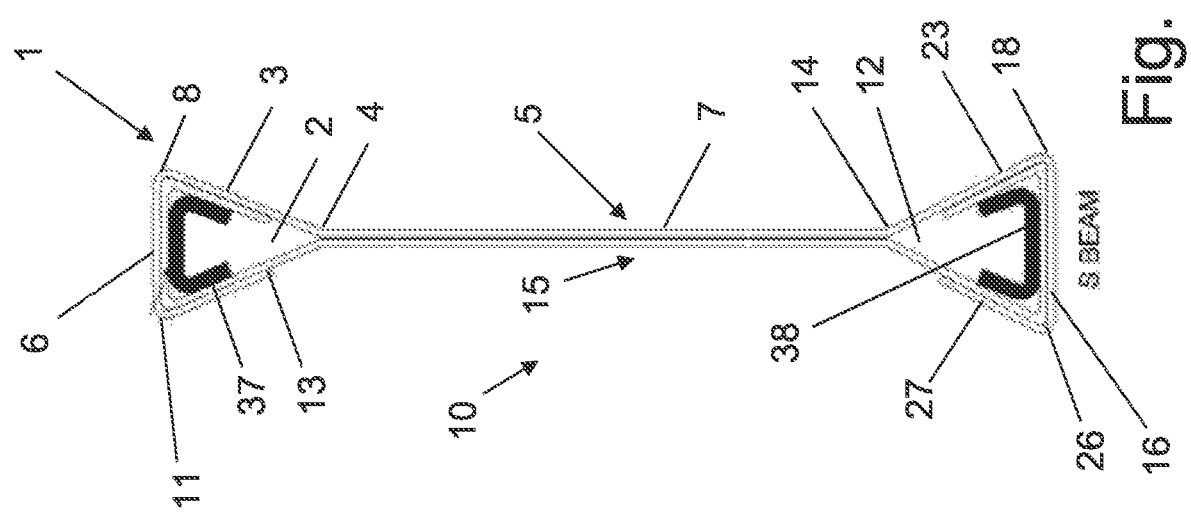
FIG. 1 is a side view of one embodiment of a beam system.

FIG. 1 illustrates a side view of a beam system 1, according to one embodiment of the present invention. Beam system 1 comprises a composite beam 10 and two reinforcement elements 37 and 38 inserted within the interior of the two triangular head portions, respectively, of the beam.

It will be appreciated that a composite beam of the invention may be used not only as a beam when it is horizontally or obliquely oriented, but also as a post when it is vertically oriented. The following description applies to a beam having a horizontal orientation, but all other beam orientations are also applicable.

Beam 10 comprises two identical oppositely oriented and transversely extending members 5 and 15 that are nested one within the other. The following description relates to member 5, and it will be appreciated that member 15 is similarly configured.

Member 5 has a first head portion 2, a second head portion 12, and a longitudinally disposed web portion 7 interposed between first head portion 2 and second head portion 12. First head portion 2 has an essentially laterally disposed flange 6, i.e. perpendicular to the longitudinally disposed web portion 7, oblique element 3 extending from transversally extending first head portion junction 4 to junction 8 at one lateral end of flange 6, and lip 13 extending obliquely from junction 11 of flange 6 at the other transversal end thereof. Lip 13 is directed towards junction 4; however its length is considerably shorter than oblique element 3. Second head portion 12 has an essentially laterally disposed flange 16 having a lateral dimension longer than flange 6 of first head portion 2, oblique element 23 extending from transversally extending second head portion junction 14 to junction 18 at one lateral end of flange 16, and lip 27 extending obliquely from junction 26 of flange 16 at the other lateral end thereof. Lip 27 is directed towards junction 14; however its length is considerably shorter than oblique element 23.

The angle between lip 13 and flange 6 of first head portion 2 is essentially equal to the angle between oblique element 23 and flange 16 of second head portion 12. The angle between lip 27 and flange 16 of second head portion 12 is essentially equal to the angle between oblique element 3 and flange 6 of first head portion 2. The longitudinal dimension from junction 14 to flange 16 of second head portion 12 is substantially equal to the sum of the longitudinal dimension from junction 4 to flange 6 of first head portion 2 and of the thickness of flange 6. Thus when the two head portions of member 15 are nested within the two head portions of member 5, corresponding elements of members 5 and 15 are in mutual stabilizing contact, meaning that an element of member 5 is adapted to physically contact and to stabilize a corresponding element of member 15, or vice versa, when an external force is applied to beam 10 which causes insignificant relative displacement of member 5 with respect to member 15. While two elements in mutual stabilizing contact may not necessarily be in mutual physical contact, said two elements may be in physical contact during the application of an external force. Thus the mutual stabilizing contact will prevent further displacement of the displaced element. As illustrated, each web portion 7 of members 5 and 15, and each corresponding pair of flanges 6 and 16, of oblique element 3 and lip 27, and of oblique element 23 and lip 13 are in mutual stabilizing contact. Since beam provides mutual stabilizing contact between corresponding elements of members 5 and 15, the thickness of the sheet steel may be only 4 mm, requiring a relative simple cold rolling machine, yet provides the structural strength of 8-mm thick sheet steel.

Composite beam 10 also promotes stiffened apices when the first and second head portions are in a nested arrangement. Although the first and second head portions are incomplete triangles, an essentially closed triangle is formed when they are in a nested arrangement. Thus, with reference to the bottom composite head portion, a closed triangle is defined by a two-layered base consisting of flanges 6 and 16, a first side which is oblique element 23 of member 5, and a second side which is oblique element 3 of member 15. As the first head portion of member 15 is nested within the second head portion of member 5, the vertices, or rounded portions connecting two adjacent elements in the vicinity of a junction, of first head portion of member 15 are stiffened by the vertices of the second head portion of member 5, which are in mutual stabilizing contact therewith. The closed triangle of a composite head portion is preferably an equilateral triangle, although a closed triangle having other combinations of angles is also suitable.

Another advantage provided by the formation of a closed triangle by a composite head portion is that, due to the difference in dimensions of the first and second head portion elements, each pair of first head portion junction 4 and second head portion junction 14 are coplanar on a plane perpendicular to flanges 6 and 16. If a first head portion junction 4 and second head portion junction 14 were not coplanar on a plane perpendicular to flanges 6 and 16 in contradistinction to the present invention, regions of the two web portions 7 would not be in mutual stabilizing contact. For example, with reference to the bottom composite head portion, junction 14 of member 5 may be laterally spaced from junction 4 of member 15, causing the region of web portion 7 of member 5 below junction 4 of member 15 to be unsupported and therefore being susceptible to buckling when a sufficiently high force is applied. The closed-triangle configuration of the composite head portion of the present invention therefore increases the lateral stability of the beam, which is of much importance when exposed to high winds or earthquakes.

Reinforcement element 37 may be configured as an inverted U-shaped bar, such that its base is in contact with the flange of member 15 and its two legs are in contact with the two oblique elements, respectively, of member 15 and are directed towards junction 4. Reinforcement element 38 is similarly configured, but in opposite orientation, with its two legs being directed towards junction 14. Reinforcement element 37 has a significantly greater thickness than the thickness of members 5 and 15, for example a reinforcement element thickness of 10 mm.

It will be appreciated that a reinforcement element of any other desired configuration may also be employed, as long as it forcibly contacts or engages the interior wall of a head portion.

Figure 2:
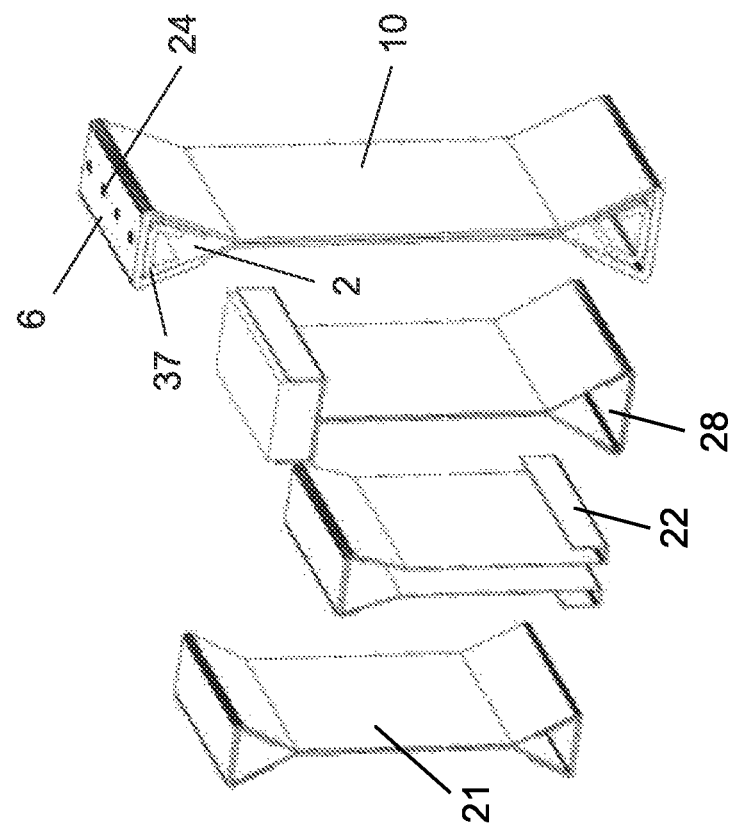
FIG. 2 is a perspective view from the side of a plurality of differently configured beams.
Figure 3:
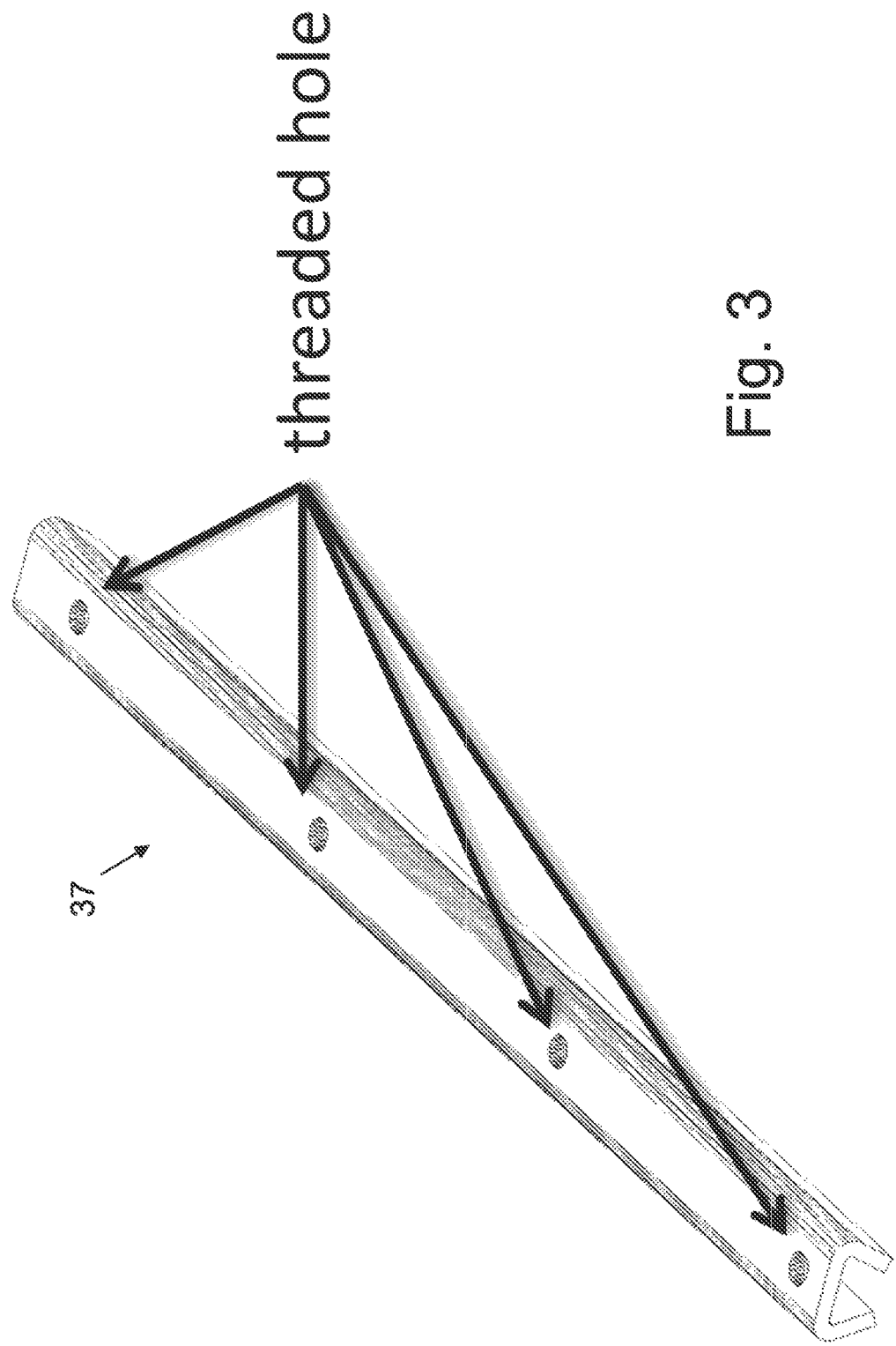
FIG. 3 is a perspective view from the top of an embodiment of a reinforcement element that is usable in conjunction with any of the beams of FIG. 2.

As shown in FIG. 2, flange 6 of composite beam 10 is formed with a plurality of transversely spaced through holes 24, through which cold fasteners, e.g. screws, bolts, and rivets, are introduced in order to be threadedly engaged with corresponding aligned internally threaded holes 39 formed in reinforcement element 37 illustrated in FIG. 3, without the need of nuts. Reinforcement element 37 has the same transversal dimension as beam 10, and may be simply linearly introduced into the interior of the head portion until the threaded holes of the reinforcement element are aligned with the through holes of flange, as determined by visual inspection or by means of markers as well known to those skilled in the art. Despite the long transversal dimension of beam 10, which may be as much as 15 m or even 25 m, head portion 2 remains reinforced by virtue of the force applied by reinforcement element 37 onto the abutting surfaces thereof.

In addition to illustrating beam 10, FIG. 2 also illustrates beam 21 similarly configured as beam 10 with two triangular head portions but with a significantly shorter web, for use for example in conjunction with a shear panel. Buckling of the short web of beam 21 is prevented by virtue of the two triangular head portions. Channeled beam 22 has one triangular head portion, and may be used for load bearing studs or roof framing. Beam 28 has one triangular head portion and one rectangular hollow head portion for receiving, for example, a wood section or a floor beam.

Figure 4:
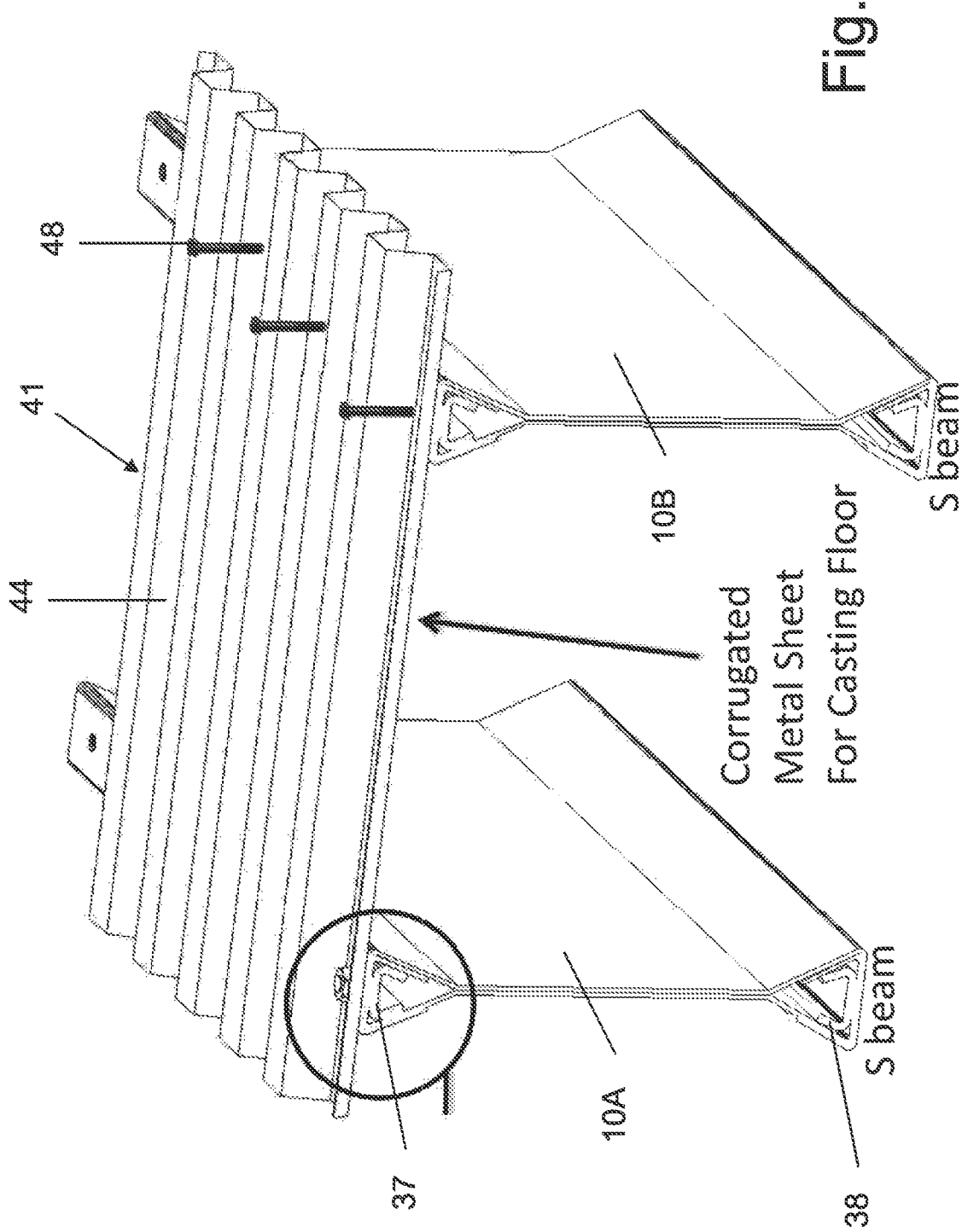
FIG. 4 is a perspective view from the side of another embodiment of a beam system.

FIG. 4 illustrates a beam system 41 comprising a laterally extending corrugated metal sheet 44, which is connected by a plurality of bolts 48 to two identical transversally extending composite beams 10A and 10B and to corresponding reinforcement elements 37 and 38. Corrugated sheet 44 may be used for the casting of a floor, or for any other desired purpose. Bolts 48 enable the transmission of tensile and compressive forces, as well as moments, between corrugated sheet 44 and one or both composite beams.

Figure 5:
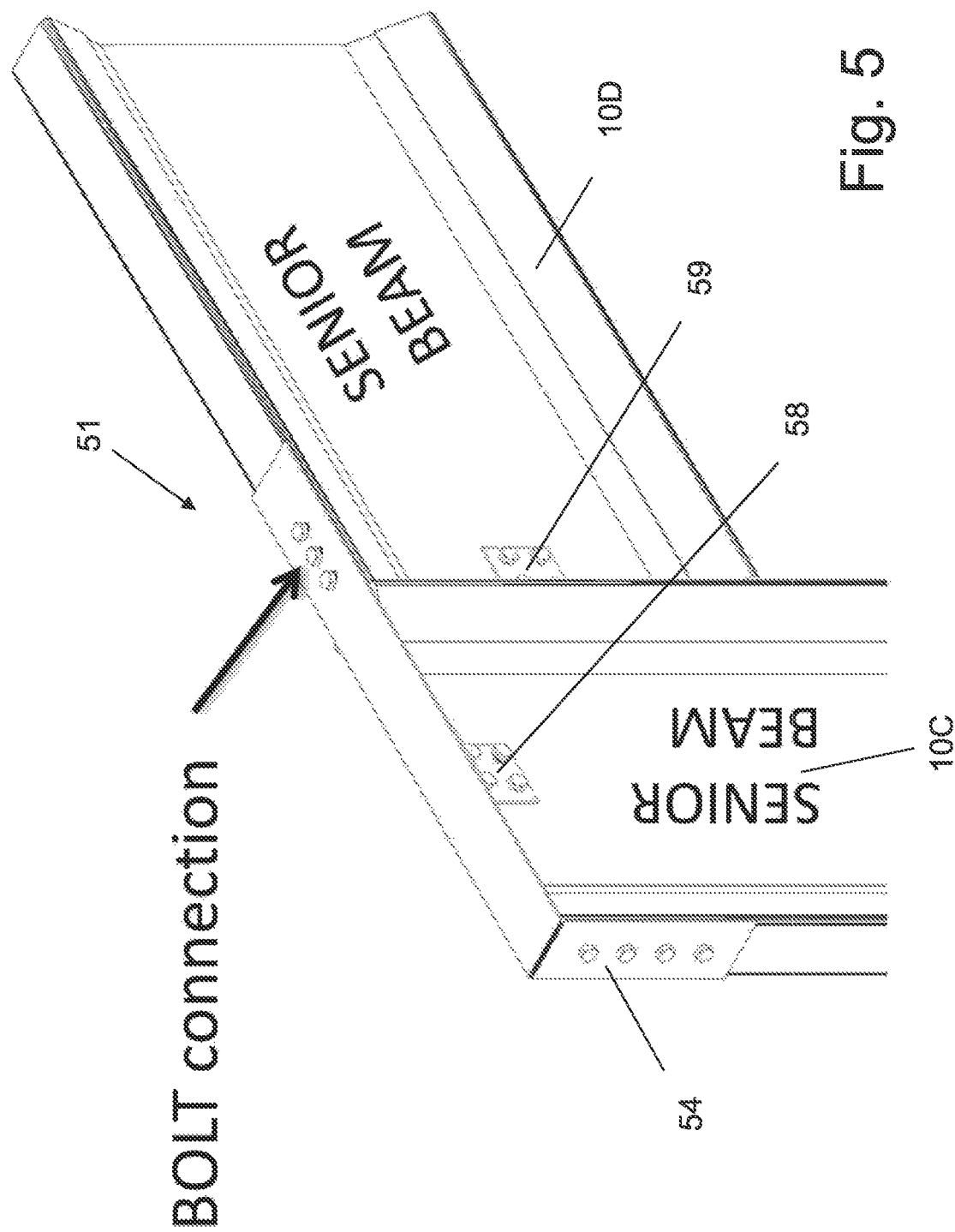
FIG. 5 is a perspective view from the top of another embodiment of a beam system.

FIG. 5 illustrates an assembled corner-connected beam system 51 for connecting a vertically oriented composite beam 10C and a horizontally oriented composite beam 10D, which has a considerably shorter vertical dimension than composite beam 10C, by a moment connection. Beam system 51 comprises a plurality of connectors, each of which is connected to one or both of beams 10C and 10D, including angled connector 54 and rectangular end plates 58-59, e.g. square. Beams 10C and 10D are transversally aligned when connected together.

Beam system 51 may be configured with reinforcement elements, or, alternatively, without reinforcement elements. When beam system is configured without reinforcement elements, the connectors may be connected to a beam by various means such as rivets, or bolts and nuts which are manipulated with a tool introduced into a head portion.

Beam system 51 is therefore modular in the sense that the same beam can be used in many different applications, and may also be disassembled from a first connector and attached to a second connector. Another advantage of the beam system of the present invention is that a connector may be attached to a beam of an existing structure without any welding, in order to distribute the load applied by an assembly that is newly mounted onto the structure, e.g. an industrial air conditioner. With respect to prior art beam systems, in contrast, the structure needs to undergo renovations, including bracing and welding, in order to reduce the concentrated stress imposed by the newly mounted assembly.

Figure 6:
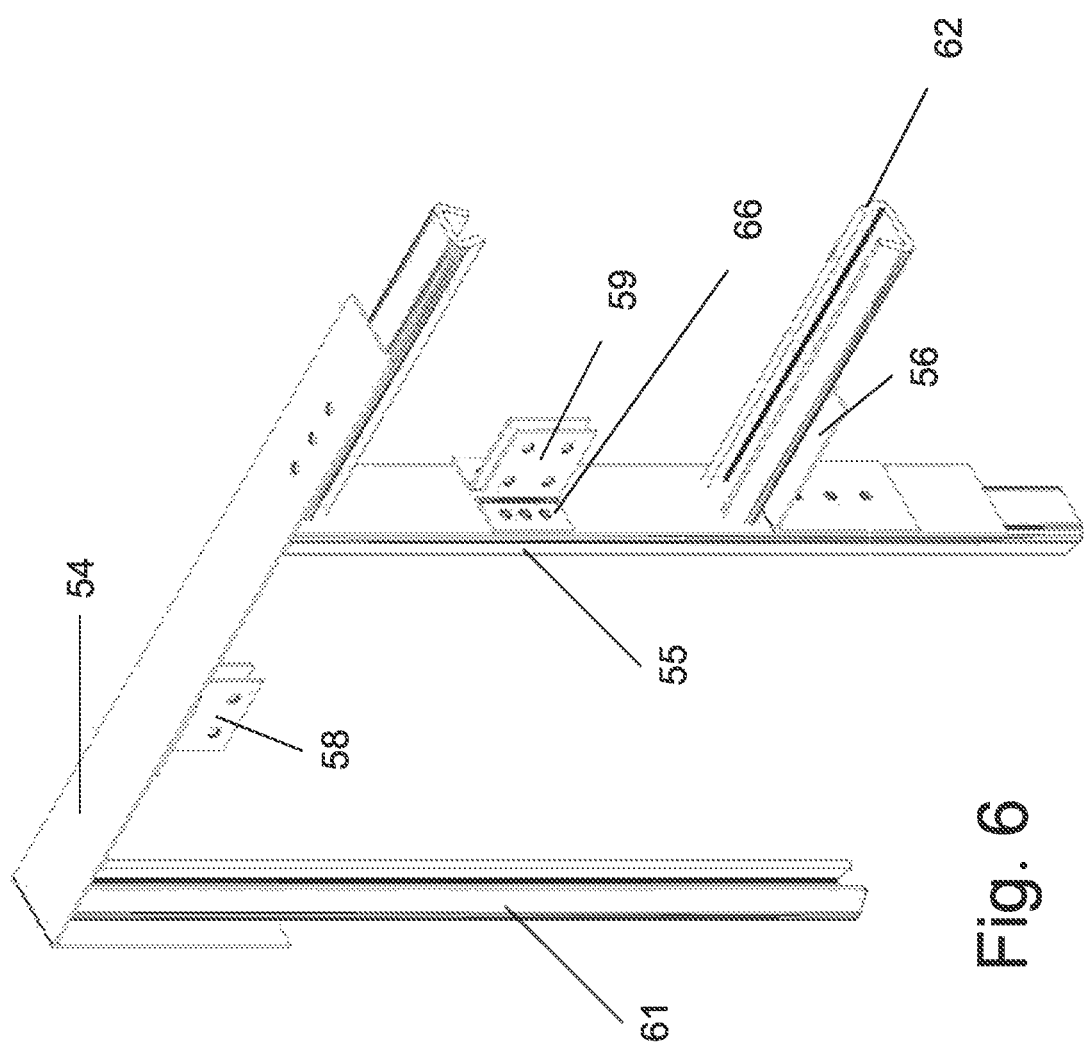
FIG. 6 is a perspective view from the side of the beam system of FIG. 5, shown without the beams.

FIG. 6 illustrates the plurality of connectors, when the beams have been removed, for clarity. As shown in one embodiment, there are three angled connectors 54-56, two pairs of flanged end plates 58-59, and two uniform-thickness reinforcement elements 61-62 having a uniform longitudinal dimension.

Figure 7:
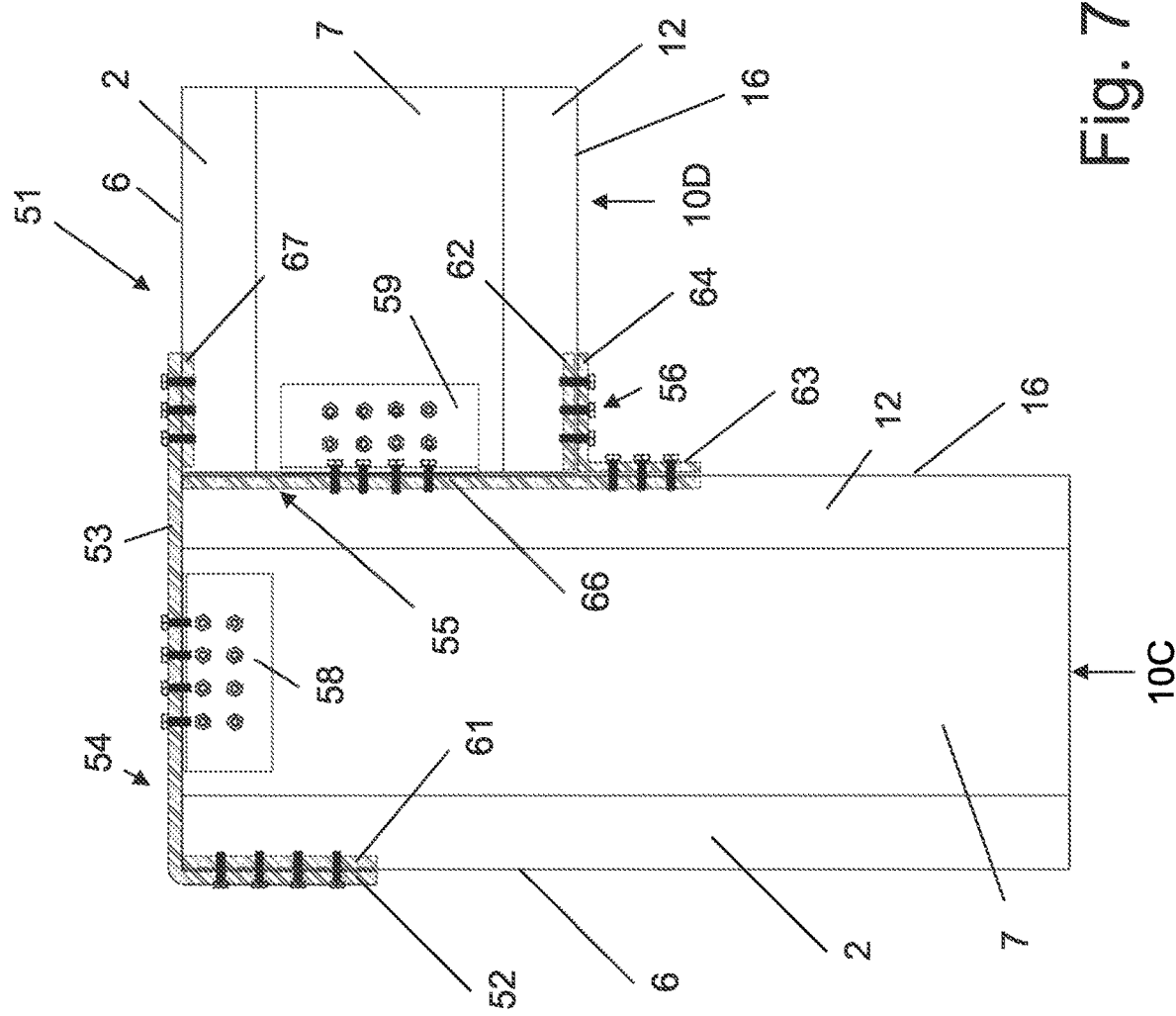
FIG. 7 is a side view of the beam system of FIG. 5, showing reinforcement elements and angled connectors in cross sectional view.

FIG. 7 illustrates one way for assembling beam system 51.

While beams 10C and 10D are separated from each other, the long leg 66 of angled connector 55 is inserted within head portion 12 of beam 10C such that its short leg 67 protrudes from the upper edge of beam 10C and transversally extends from flange 16 in a direction away from flange 6. Since the long leg 66 of angled connector 55 serves as a reinforcement element, it may be configured as a U-shaped bar to forcibly contact the interior wall of head portion 12, as described above. Any other reinforcement element described herein may also be similarly configured.

The short leg 52 of angled connector 54, while in in abutment with flange 6 of beam 10C, is then connected by cold fasteners to corresponding threaded holes formed in reinforcement element 61, when the latter in inserted within head portion 2. In order to ensure positional stability and accessibility of reinforcement element 61, beam 10C may be temporarily rotated so as to be horizontally oriented, for example supported on a horizontal stand. Following connection of leg 52 to reinforcement element 61, the long leg 53 of angled connector 54 is separated by a small gap from the unsecured short leg 67 of angled connector 55.

After reinforcement element 62 has been inserted within head portion 12 of beam 10D, the latter is displaced towards beam 10C, for example by means of a crane, until positioned in abutment with flange 16 of beam 10C and flange 6 of beam 10D is fed through the gap between long leg 53 of angled connector 54 and short leg 67 of angled connector 55. The two legs of angled connector 54 interfacing with the flange 16 of both beams 10C and 10D is connected by fasteners into the threaded holes of reinforcement element 61 and leg 66 of angled connector 55, respectively. When the long leg 53 of angled connector 54 is then connected by fasteners into the threaded holes of short leg 67 of angled connector 55, beams 10C and 10D become connected together.

In order to reinforce the moment connection at the vicinity of web 7 of beam 10D, an end plate 59 is placed in abutment with each lateral face of web 7. As shown in FIG. 6, each end plate 56 is L-shaped, being provided with a flange 66, which is connected by fasteners into corresponding threaded holes formed in leg 66 of angled connector 55. The two end plates 59 of a pair are then connected to each other by bolts and nuts passing through corresponding through holes formed in the web. Two end plates 58 similarly reinforce web 7 of beam 10C by being connected to leg 53 of angled connector 54 via corresponding flanges and by being connected to each other.

The number of through holes or threaded holes that are bored at any given location depends on engineering considerations, such as the thickness of the sheet metal, the dimensions of the beam, and the stress concentration at said location. The holes may assume any convenient shape including circular, rectangular and oval apertures. Alternatively, the holes may be bored in situ.

If for some reason the holes of a beam and connector are not aligned, the modularity of the beam system of the invention affords a construction worker sufficient flexibility to reposition the beam or connector in such a way to ensure that the connector and beam will be connected. For example, the beam can be transversally displaced in telescopic fashion until its holes will be aligned with other holes of the connector. Alternatively, the holes of the connector may be suitably formed, such as by having an elliptical shape, so that when the beam is slightly displaced transversally, a portion of a connector member hole will be sufficiently exposed to permit engagement with a cold fastener passing through a corresponding beam hole even though another portion of said connector hole is covered by the beam periphery. If the beam hole cannot be aligned with the connector holes, additional holes may be bored in the beam periphery.

In lieu of angled connector 55, a reinforcement element inserted through head portions 2 and 12 may be connected to leg 53, and a reinforcement element inserted through head portion 12 may be connected to leg 63 and to flanged end plate 59.

Figure 8:
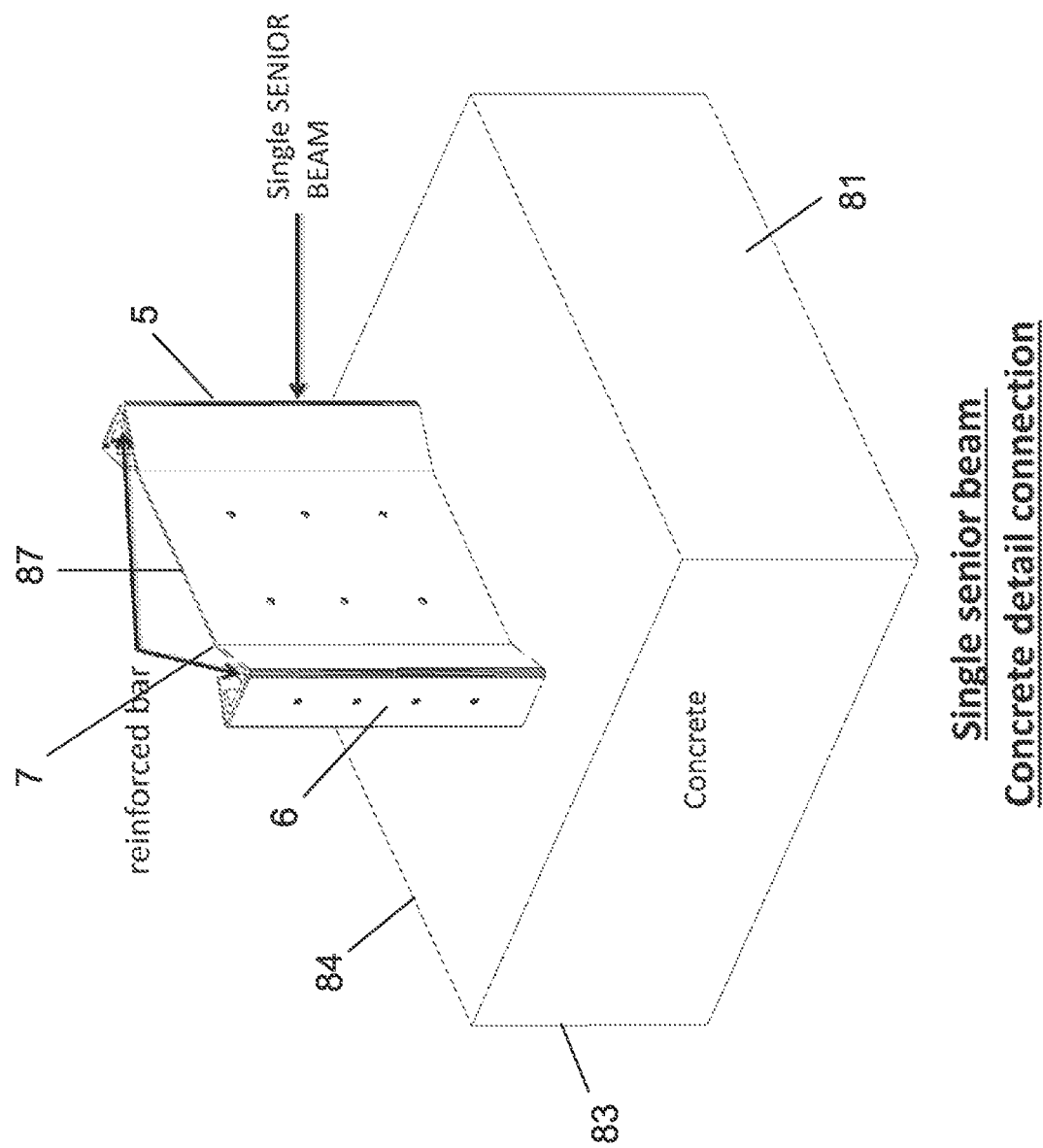
FIG. 8 is a perspective view from the top of a foundation-embedded beam system.
Figure 9:
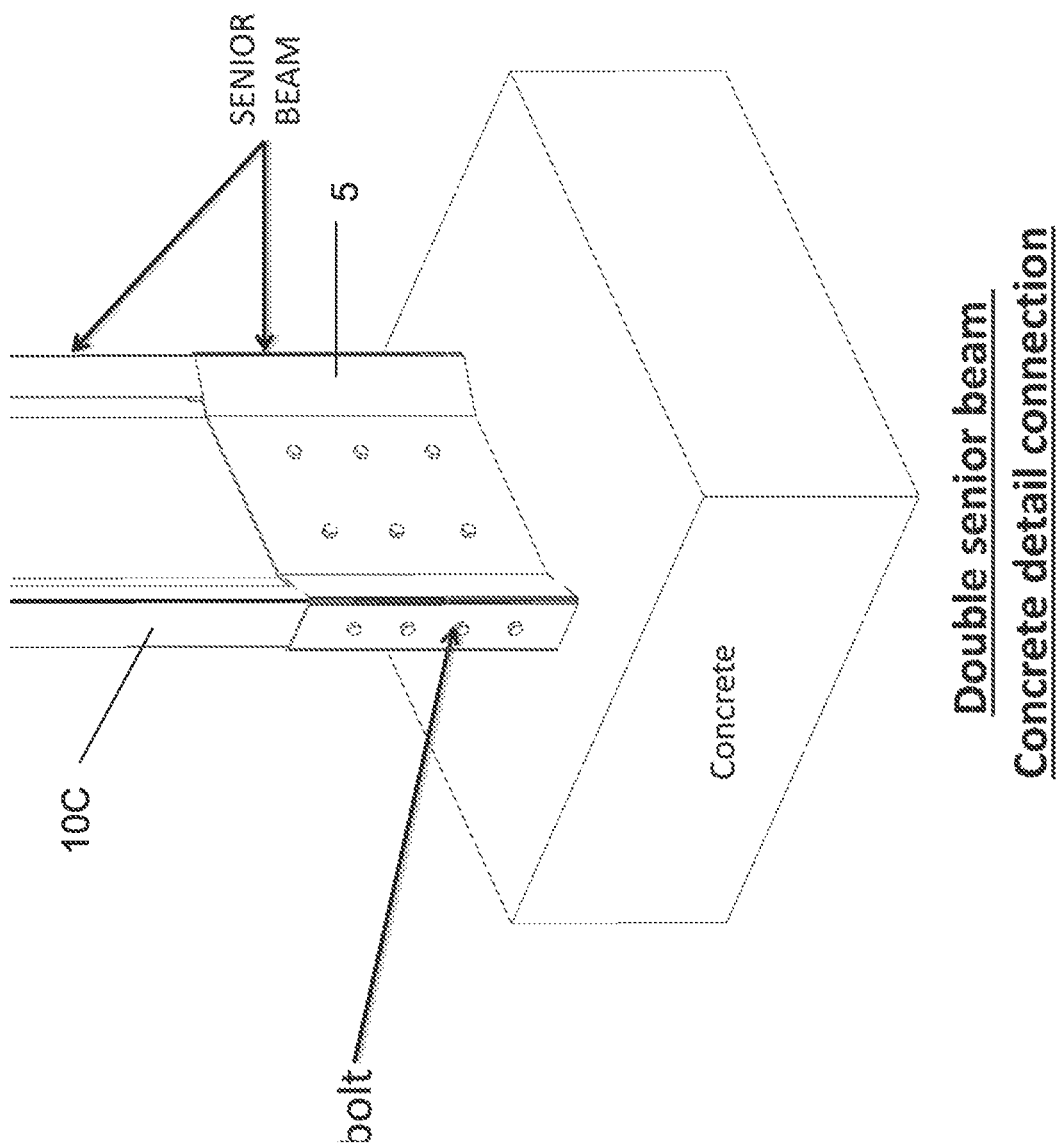
FIG. 9 is a perspective view from the top of the beam system of FIG. 8, shown together with a nested beam.
Figure 10:
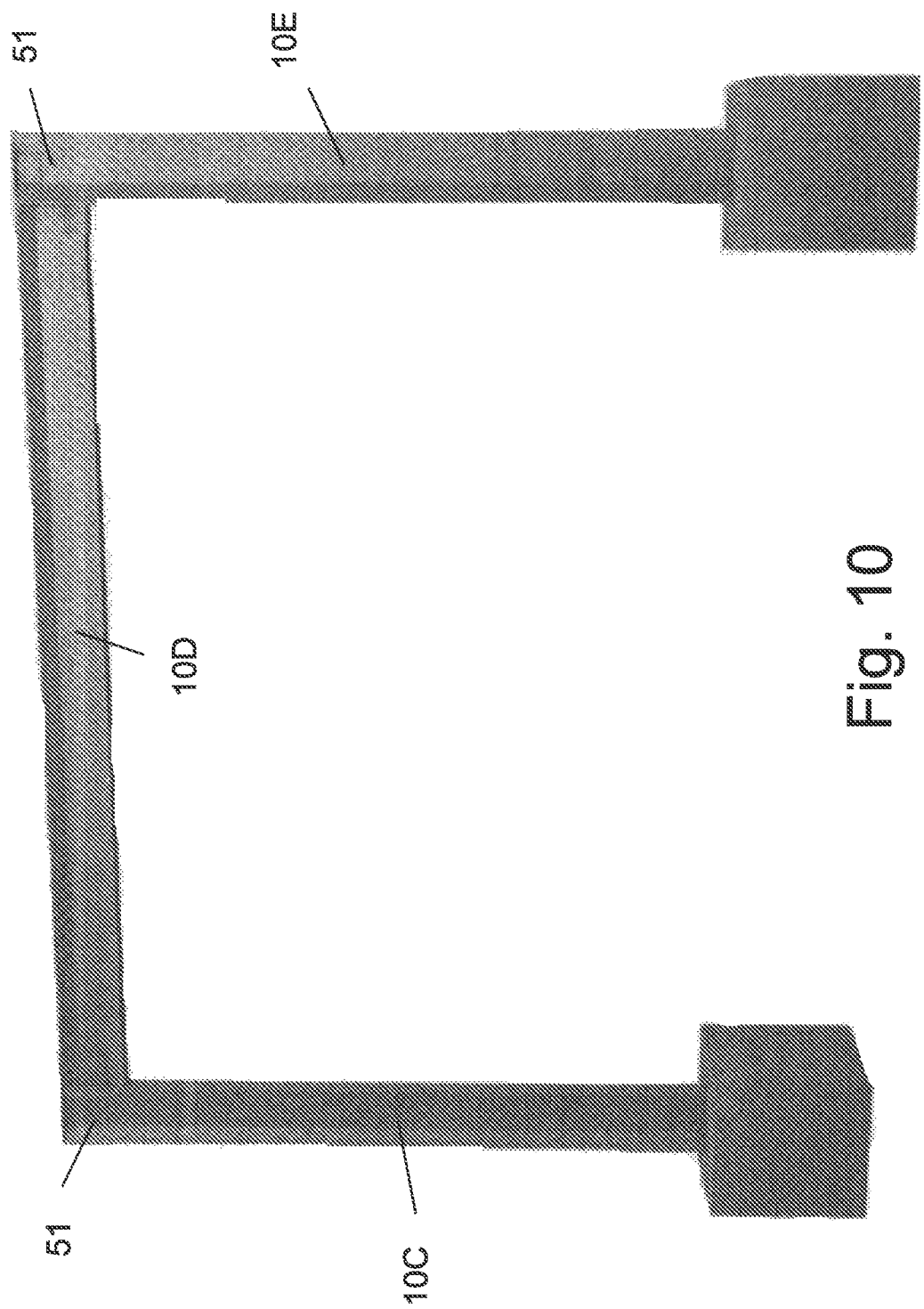
FIG. 10 is a perspective view from the side of a beam system comprising two foundation-embedded beams.

FIGS. 8-10 illustrate another embodiment of the invention wherein beam system 81 comprises at least one beam member that is embedded in a foundation 83 to provide the beam system with sufficient structural strength to withstand all anticipated forces and moments to which it will be subjected.

Vertically oriented beam member 5 is shown in FIG. 8 to be embedded in foundation 83, after having been positioned at a bottom surface 81 within the formwork interior into which concrete for fabricating the foundation is poured. The height of beam member 5 from upper foundation surface 84 to upper beam member edge 87 is sufficiently high to support elements of the beam system without buckling prior to the addition of other structural elements. The flange 6 and web 7 of beam member 5 is formed with through holes to facilitate connection with a beam to be secured thereto.

A vertically oriented composite beam 10C is nested within the embedded beam member 5 in FIG. 9. After a reinforcement element is inserted within each head portion of beam 10C, each flange of beam member 5 is connected to a corresponding reinforcement element and the web of beam member is connected to the web of beam 10C.

FIG. 10 illustrates beam system 81 comprising two spaced foundation-embedded vertically oriented beams 10C and 10E, and horizontally oriented beam 10D that is connected to beams 10C and 10E by corresponding corner connections 51.

FIG. 11 illustrates a C-shaped hanger 95 for connecting two or more beams to each other. Hanger 95 comprises two parallel legs 91 and 92, e.g. rectangular, a flange-engageable element 93 interconnecting legs 91 and 92, and a laterally extending mounting plate 97 welded to a transversal end of leg 92.

FIGS. 12 and 13 illustrate beam system 101 comprising hanger 95 when its interconnecting element 93 is engaged with the flange 6 of beam 10A. A threaded rod 99 passing through the web 7 of beam 10A and the two legs 91-92 of hanger 95 and secured to each leg by a corresponding nut 98 retains the two legs in a spaced relation despite the application of a load on mounting plate 97. The load is shown to be constituted by a beam 104 which is connected to mounting plate 97, for example a beam whose flange is oblique with respect to the upper edge of the rectangular mounting plate 97.

FIG. 14 illustrates a hanger 114 similar to hanger 95 of FIG. 11, but with a longitudinally extending mounting plate 117 welded to a transversal edge of interconnecting element 93.

A beam system 111 employing a hanger 114 which is connected to beam 10A is illustrated in FIG. 15. Beam 104 is shown to be obliquely mounted on mounting plate 117.

FIG. 16 illustrates a hanger 124 similar to hanger 114 of FIG. 14, but with a laterally longer mounting plate 127, on which two laterally spaced beams 104A-B can be mounted for use in beam system 121 illustrated in FIG. 17.

FIG. 18 illustrates a hanger 134 with two laterally spaced mounting plates 136 and 137, on which two laterally spaced beams 104A-B can be mounted, respectively, for use in beam system 131 illustrated in FIG. 19.

Figure 20:
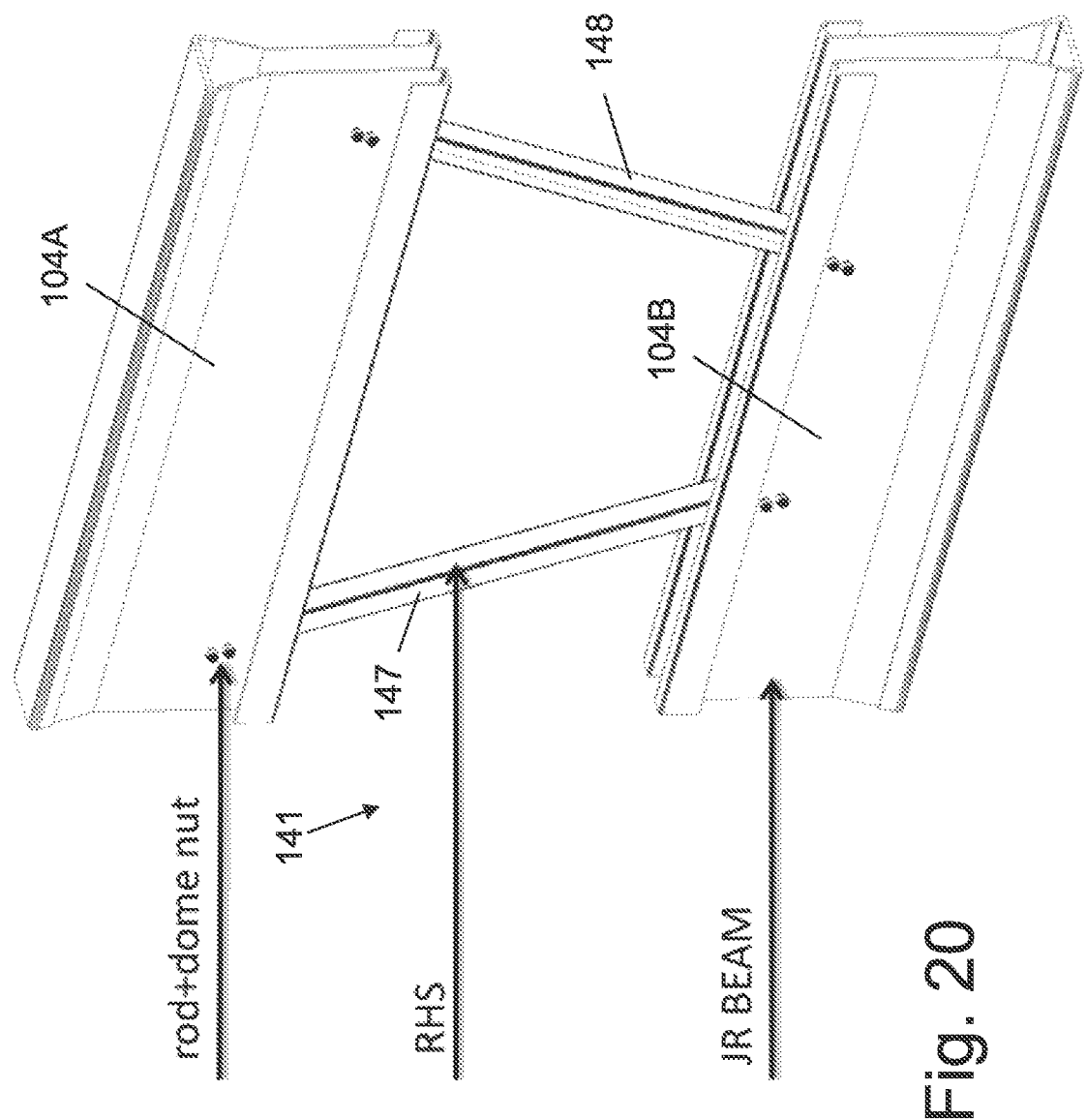
FIG. 20 is a perspective view from the side of a beam system according to another embodiment.

FIG. 20 illustrates a beam system 141 for use as a truss connection. Two transversely separated and obliquely and symmetrically oriented rods 147 and 148 configured with a square cross section are connected to the webs of two vertically spaced beams 104 and 104B, being positioned within the interior between the webs.

The beam system of the present invention is also suitable for many other kinds of beams with different profiles. Also, the reinforcement elements 37 and 38 may be implemented externally to the beam rather than being threaded or otherwise inserted within the interior of a head portion.

Although the above description related to the use of a beam system in conjunction with unwelded reinforcement elements and connectors, it will be appreciated that the scope of the invention also includes a beam system that is configured with welded reinforcement elements or with welded connectors. The aforementioned advantages of the beam system are also applicable to such an embodiment.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A reinforced beam system, comprising:
   a) one or more pairs of angularly spaced, corner-connected beams, first and second beams of at least one of said pairs configured with two oppositely oriented triangular closed head portions, a base of which defining a flange, and a web interposed between said two closed head portions;
   b) a plurality of reinforcement elements, each of which inserted within an interior of a corresponding one of said head portions and forcibly contacting an interior wall of said corresponding head portion; and
   c) for each of said pairs of corner-connected beams, at least one angled connector,
   wherein a first leg of one of said angled connectors is in abutment with the flange of a second head portion of said first beam and is connected to a first of the reinforcement elements which is inserted within said second head portion of said first beam, and a second leg of said one angled connector is in abutment with the flange of a first head portion of said second beam and is connected to a second of the reinforcement elements which is inserted within both said first head portion of said second beam and a first head portion of said first beam.

2. The beam system according to claim 1, wherein one or more of the reinforcement elements forcibly and unconnectedly contacts an interior wall of the corresponding head portion.

3. The beam system according to claim 1, wherein one or more of the reinforcement elements is configured as an inverted U-shaped bar having a base in forcible contact with the flange of the corresponding head portion and two legs in forcible contact with two oblique elements, respectively, of the corresponding head portion and directed towards a junction between the corresponding head portion and the web.

4. The beam system according to claim 1, wherein the second reinforcement element is a second angled connector which is arranged such that a first leg of said second angled connector is inserted within an interior of the first head portion of the first beam and a second leg of said second angled connector is inserted within an interior of the first head portion of the second beam.

5. The beam system according to claim 4, further comprising a third angled connector for the at least one pair of corner-connected beams,
   wherein a first leg of said third angled connector is in abutment with the flange of the first head portion of the first beam and is connected to the first leg of the second angled connector, and a second leg of said third angled connector is in abutment with the flange of a second head portion of the second beam and is connected to a third reinforcement element which is inserted within said second head portion of the second beam.

6. The beam system according to claim 1, wherein each of the first and second beams is a composite beam consisting of two separate members arranged such that corresponding head portions of said two members are nested one within the other and adjacent elements of said two members are in mutual stabilizing contact.

7. The beam system according to claim 6, wherein each member of the composite beam comprises a first head portion, a second head portion, and a longitudinally disposed web portion interposed between said first head portion and second head portion, said first and second head portions being configured with a corresponding essentially laterally disposed flange, an oblique element extending from a first lateral end of said flange to said web portion, and an oblique lip extending from a first lateral end of said flange and having a length considerably shorter than that of said oblique element.

8. The beam system according to claim 1, wherein one or more of the reinforcement elements has a uniform longitudinal dimension and is in forcible contact with the flange of the corresponding head portion.

9. The beam system according to claim 8, wherein longitudinally separated first and second head portion junctions of the composite beam at a junction between nested head portions and mutual stabilizingly contacting web portions are coplanar on a plane perpendicular to the corresponding flange.

10. The beam system according to claim 1, wherein one or more of the reinforcement elements is connected to the interior wall of the corresponding head portion.

11. The beam system according to claim 10, wherein one or more of the reinforcement elements is connected by one or more cold fasteners to the interior wall of the corresponding head portion.

12. The beam system according to claim 10, wherein one or more of the reinforcement elements is welded to the interior wall of the corresponding head portion.

13. The beam system according to claim 10, further comprising a corrugated metal sheet connected to two or more laterally spaced beams and to the reinforcement element inserted therewithin.

14. The beam system according to claim 1, wherein the first beam is a vertically oriented beam and the second beam is a horizontally oriented beam, and the first and second legs of the one angled connector are angularly spaced by an angle of approximately 90 degrees.

15. The beam system according to claim 14, wherein the vertically oriented beam is embedded in a foundation.

16. The beam system according to claim 15, wherein an additional vertically oriented beam is nested within, and connected to, the embedded beam.

17. The beam system according to claim 16, further comprising two or more foundation-embedded beams and a horizontally oriented beam connected to each two adjacent foundation-embedded beams by the first and second angled connectors.

* * * * *